United States Patent [19]
Kawai et al.

[11] Patent Number: 5,339,649
[45] Date of Patent: Aug. 23, 1994

[54] CRYOGENIC REFRIGERATOR

[75] Inventors: Masao Kawai, Aichi; Yoshihiro Kyotani, Chiba; Hideki Aruga, Aichi; Toshihiro Shiimado, Chiba; Yoshihisa Ito; Koji Hori, both of Tokyo, all of Japan

[73] Assignee: Kabushikikaisha Equos Research, Japan

[21] Appl. No.: 986,586

[22] Filed: Dec. 7, 1992

[30] Foreign Application Priority Data

Dec. 9, 1991 [JP] Japan ................. 3-324145
Dec. 9, 1991 [JP] Japan ................. 3-324146

[51] Int. Cl.$^5$ .............................. F25B 17/00
[52] U.S. Cl. ..................... 62/46.1; 62/104; 62/480
[58] Field of Search ............ 62/6, 46.1–48.3, 62/79, 101, 104–105, 238.3, 480–481, 485

[56] References Cited

U.S. PATENT DOCUMENTS

| | | | |
|---|---|---|---|
| 1,230,531 | 6/1917 | Stephenson | 62/46.1 |
| 1,717,584 | 6/1929 | Ruben | 62/101 |
| 2,293,263 | 8/1942 | Kornemann et al. | 62/46.1 |
| 2,650,478 | 9/1953 | Brown | 62/46.1 |
| 2,712,730 | 7/1955 | Spangler | 62/48.3 |
| 3,704,600 | 12/1972 | Prast et al. | 62/457 |
| 4,205,531 | 6/1980 | Brunberg et al. | 62/101 |
| 4,713,941 | 12/1987 | Toyoda et al. | 62/50 |

OTHER PUBLICATIONS

Jones, "Hydride Absorption Refrigerator System for Ten Kelvin and Below" PB Reports, 1985.

*Primary Examiner*—Henry A. Bennett
*Assistant Examiner*—William C. Doerrler
*Attorney, Agent, or Firm*—Lorusso & Loud

[57] ABSTRACT

First and second refrigerating circuits respectively cause first and second adsorbing bodies to alternately adsorb and release first and second coolants. In the first refrigerating circuit, when the first adsorbing body is heated, it releases the first coolant. The released first coolant is cooled, and discharged through an expansion valve so that a part of the first coolant is liquefied. The resultant latent heat of vaporization can be utilized to cool an object to be cooled. Thereafter, the first coolant is adsorbed when the first adsorbing body is cooled. In the second refrigerating circuit, when the second adsorbing body is heated, it releases the second coolant. The released second coolant is cooled by a liquefied-gas-type cooler, and discharged through an expansion valve so that a part of the second coolant is liquefied. The resultant latent heat of vaporization is utilized to cool the first adsorbing body of the first refrigerating circuit. Thereafter, the second coolant is adsorbed by the second adsorbing body. The liquefied-gas-type cooler cools the second coolant by utilizing the latent heat of vaporization of a liquefied gas. Thus, the amount of the second coolant liquefied after being discharged through the expansion valve in the second refrigerating circuit is increased.

20 Claims, 9 Drawing Sheets

OUTER VESSEL TEMPERATURE

HEATER CURRENT

INNER VESSEL TEMPERATURE

HELIUM GAS ADSORPTION AMOUNT

CRYOGENIC REFRIGERATOR

BACKGROUND OF THE INVENTION

The present invention relates to a cryogenic refrigerator.

In a superconducting device, it is necessary to cool a superconducting magnet section to a very low temperature. For this purpose, the superconducting magnet section is disposed, for example, in an enclosed vessel containing liquid helium, and cooled by the liquid helium within the liquid helium vessel to a temperature of approximately 4.2° K. Further the liquid helium vessel is surrounded by an adiabatic casing, and the interior of the casing is maintained in a vacuum, so as to prevent heat of the atmosphere outside the adiabatic casing from transferring to the inside of the liquid helium vessel.

However, heat from the ambient atmosphere may transfer in the form of heat conduction via piping or in the form of heat radiation to the inside of the liquid helium vessel through the adiabatic casing. Such heat radiation may cause corresponding vaporization of liquid helium.

In order to cope with this problem, a cryogenic refrigerator is used to collect helium gas and reconvert it into liquid helium.

In such a cryogenic refrigerator, identical refrigerating circuits, each comprising an adsorbent, a counterflow heat Exchanger and a Joule-Thomson expansion valve, are serially connected together in a plurality of stages so as to create a cryogenic condition.

In each refrigerating circuit, the adsorbent is cooled and heated alternately. The adsorbent is heated to thereby release a coolant therefrom. Then, the coolant is sent to the Joule Thomson expansion valve to be expanded, and the Joule-Thomson effect provided at this time is utilized to lower the temperature of the coolant. Coolant whose temperature has been lowered in a preliminary stage is utilized to cool the adsorbent of the subsequent stage. A cryogenic condition is created in this way.

However, a conventional cryogenic refrigerator comprises a plurality of stages of identical refrigerating circuits, in all of which the adsorbent is used in a similar manner. As a result, the entire apparatus is inevitably large. This problem will be described in detail.

When activated carbon for example is used as the adsorbent the amount of adsorption increases as the temperature lowers, and this increase causes a corresponding increase in cooling ability. Conversely, the amount of adsorption decreases and, accordingly, cooling ability decreases, as the temperature rises.

Therefore, among the plurality of stages of refrigerating circuits, the quantity of the adsorbent used is to be smaller toward the final stage and larger toward the first stage. As a result, the increase in size and weight is particularly evident in those refrigerating circuits nearer the first stage. This makes it totally impossible to install the cryogenic refrigerator in a vehicle.

When the coolant is to be adsorbed by the adsorbent, the adsorbent is cooled by utilizing coolant resulting from the preliminary stage. On the other hand, when the coolant is to be released from the adsorbent, the adsorbent is heated by using a suitable heating fluid. For this purpose, it is necessary to intermittently supply the preliminary-stage coolant and the heating fluid to the adsorbent. Thus, a thermal switch, including an electromagnetic valve or the like, has to be disposed in the flow passage for the coolant and the heating fluid.

In order that the thermal switch be electromagnetically controlled at a high level of precision in a cryogenic environment, the solenoid section of the electromagnetic valve, etc. must be maintained at normal temperature. As a result, the solenoid section at normal temperature and the actuator section at a very low temperature are inevitably separated from each other. Disadvantageously, controllability deteriorates, and the electromagnetic valve becomes large in size. In addition, heat of the ambient atmosphere may transfer through the joint between the solenoid section at normal temperature and the actuator section at a very low temperature, thereby lowering operational efficiency.

SUMMARY OF THE INVENTION

An object of the present invention is to provide a cryogenic refrigerator capable of overcoming the problems of the conventional cryogenic refrigerator, that is, capable of performing temperature control with high precision without an increase in the size and weight of the entire apparatus, and capable of operating at high efficiency.

According to the present invention, a cryogenic refrigerator includes: a first refrigerating circuit for causing a first adsorbing substance to alternately adsorb and release a first coolant; a second refrigerating circuit for causing a second adsorbing substance to alternately adsorb and release a second coolant; and a controller for controlling said first refrigerating circuit and said second refrigerating circuit. The first refrigerating circuit and the second refrigerating circuit constitute refrigerating circuits in two stages.

The first refrigerating circuit includes: said first adsorbing substance; first heating means for heating said first adsorbing substance; first cooling means for cooling said first adsorbing substance; a coolant conduit for conveying said first coolant; an expansion valve disposed in said coolant conduit; a load cooler disposed downstream of said expansion valve for cooling an object to be cooled; and at least one heat exchanger for heat exchange between a portion of said first coolant located upstream of said expansion valve and another portion of said first coolant located downstream of said load cooler. The controller is adapted to intermittently actuate the first heating means.

With the above construction, when the first heating means is actuated, and the first adsorbing substance is thus heated, the first coolant is released from the first adsorbing substance. The released first coolant is cooled by the heat exchanger. Thereafter, the first coolant is, in its high-pressure state, sent to the expansion valve, and then discharged through the expansion valve. At this time, a part of the first coolant is liquefied. The latent heat of vaporization provided by the liquefied part of the first coolant can be utilized in the load cooler to cool an object to be cooled to a very low temperature. After cooling the object, the first coolant is adsorbed when the first adsorbing substance is cooled while the first heating means is stopped.

The second refrigerating circuit includes: said second adsorbing substance; second heating means for heating said second adsorbing substance; second cooling means for cooling said second adsorbing substance; a coolant conduit for conveying said second coolant; an expansion valve disposed in said coolant conduit; a cooler disposed downstream of said expansion valve and constituting said first cooling means; a liquefied gas-type cooler disposed upstream of said expansion valve for cooling said second coolant; and at least one heat exchanger for heat exchange between a portion of said second coolant located upstream of said expansion valve and another portion of said second coolant located downstream of said cooler. The above controller is also adapted to alternately and intermittently actuate the second heating means and the second cooling means.

With the above construction, when the second heating means is actuated, and the second adsorbing substance is thus heated, the second coolant is released from the second adsorbing substance. The released second coolant is cooled by the liquefied-gas-type cooler and the heat exchanger. Thereafter, the second coolant is, in its high-pressure state, sent to the expansion valve, and then discharged through the expansion valve. At this time, a part of the second coolant is liquefied. The liquefied part of the second coolant can be utilized to cool the first adsorbing substance in the cooler constituting the first cooling means. After cooling the first adsorbing substance, the second coolant is adsorbed by the second adsorbing substance by actuating the second cooling means.

The liquefied-gas-type cooler is connected to liquefied gas supply means so as to cool said second coolant by utilizing the latent heat of vaporization of a liquefied gas. The liquefied-gas-type cooler promotes the cooling of the second coolant, thereby enabling the cooling effect to sufficiently function. Therefore, even when the second refrigerating circuit uses an adsorbing device, it is possible to increase the amount of the second coolant which is liquified by discharge through the expansion valve. Accordingly, the size of the entire apparatus can be reduced.

The expansion valve may comprise a Joule-Thompson expansion valve. The first adsorbing substance may comprise an adsorbent and the first coolant may comprise helium. The second adsorbing substance may comprise an occluding substance and the second coolant may comprise hydrogen.

Preferably, the components of the first refrigerating cycle, the liquefied gas supply means, those components of the second refrigerating cycle other than the adsorbing device comprising said second adsorbing substance, said second heating means and said second cooling means may all be accommodated in an adiabatic casing, with the adsorbing device being disposed in an atmosphere having a temperature higher than the temperature within said adiabatic casing.

In a preferred form of an adsorbing device for the first refrigerating cycle, an adsorbent serving as a first adsorbing substance, and a heating means for heating the adsorbent are accommodated in an inner vessel made of a material having a high thermal conductivity, and a first coolant chamber is formed inside the inner vessel. The inner vessel is accommodated in an outer vessel with a second coolant chamber formed between said inner vessel and said outer vessel. The second coolant chamber is constantly supplied with a second coolant.

With the above construction, the first coolant can be released by actuating the heating means, thereby heating the adsorbent. The first coolant can be adsorbed by stopping the heating means, thereby causing the adsorbent to be cooled by the second coolant supplied to the second coolant chamber.

The preferred form of the adsorbing device of the first refrigerating cycle includes a one-way valve through which the first coolant can be discharged from said first coolant chamber, and another one-way valve through which said first coolant can be fed back to said first coolant chamber. With this construction, the first coolant can be automatically discharged from the first coolant chamber and fed back to the first coolant chamber.

The second coolant is continuously supplied to the second coolant chamber. Accordingly, there is no need to start and stop the supply of the second coolant by utilizing a thermal switch including an electromagnetic valve or the like. Therefore, there is no risk of heat of the ambient atmosphere entering through the electromagnet, thereby improving the thermal efficiency.

The use of an electromagnetic valve entails the need to dispose the movable part of the electromagnetic valve at a location under a temperature close to normal temperature, and to extend another part of the electromagnetic valve to the second coolant chamber. The construction according to the present invention does not use such an electromagnetic valve, thereby enabling a reduction in the size of the entire apparatus.

A plurality of adsorbing bodies and a plurality of heating means may be provided, the heating means being able to be alternately and intermittently actuated to independently heat the corresponding adsorbent bodies. In this case, a plurality of inner vessels are provided, and they independently accommodate the adsorbent bodies and the heating means. With this construction, the first coolant is released from only the heated adsorbent body.

The plurality of inner vessels are accommodated in a single outer vessel with a common second coolant chamber formed between said inner vessels and said outer vessel. With this construction, since the inner vessels are continuously cooled by a second coolant, the adsorbent bodies adsorb the first coolant when the heating means are not actuated.

In this latter embodiment, the plurality of inner vessels forming therein first coolant chambers are combined with a plurality of one-way valves through which first coolants can be independently discharged from the corresponding first coolant chambers, and a plurality of one-way valves are provided through which said first coolants can be independently fed back to the corresponding first coolant chambers. With this construction, the first coolant is selectively discharged from and fed back to the corresponding inner vessels through the corresponding one-way valves.

The second coolant is continuously supplied to the second coolant chamber, and the plurality of heating means are alternately and intermittently actuated.

The heating means may comprise a pair of electrodes provided on an electrically conductive adsorbent, and a power circuit connected to the electrodes for supplying electric current to the adsorbent. With this construction, there is no need to provide a heater in an inner vessel, thereby enabling a reduction in the size of the entire apparatus. Furthermore, since no elements other than the adsorbent bodies are heated, the heat efficiency is very high.

BRIEF DESCRIPTION OF DRAWINGS

The structures and features of cryogenic refrigerators according to the present invention will become apparent from the description below with reference to the following drawings, in which.

DESCRIPTION OF PREFERRED EMBODIMENTS

Embodiments of the present invention will now be described in detail with reference to the drawings.

Figure 1:
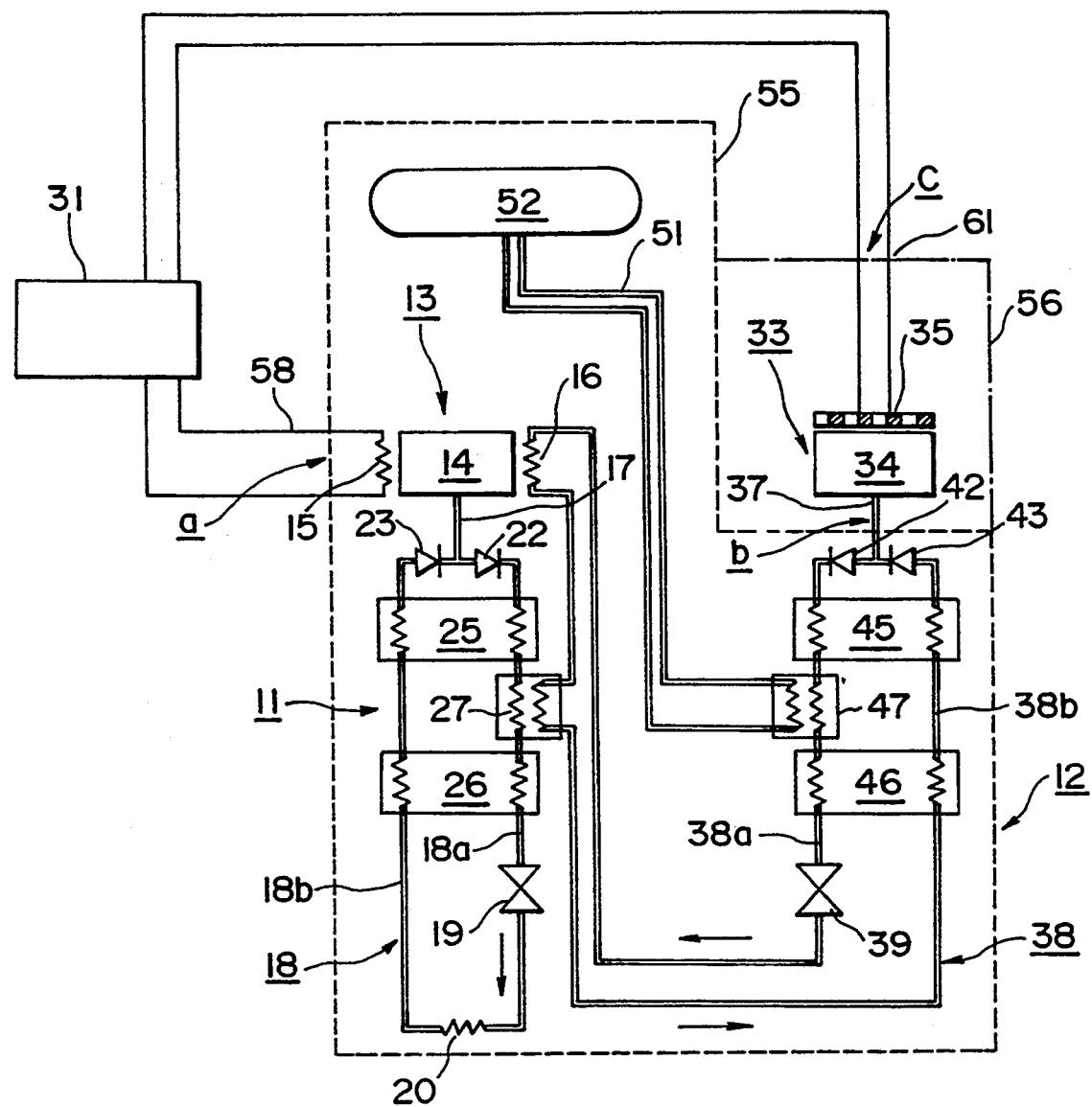
FIG. 1 is a schematic diagram showing a cryogenic refrigerator according to a first embodiment of the present invention.

Referring to FIG. 1, the apparatus includes a first refrigerating circuit 11 for cooling a heat load, and a second refrigerating circuit 12 constituting a low-temperature source for the first refrigerating circuit 11. The first refrigerating circuit 11 and the second refrigerating circuit 12 constitute a two stage refrigerating unit and cooperate together to create a cryogenic condition of approximately 4.2° K. The first refrigerating circuit 11 is an adsorption-type refrigerating circuit using helium (He) as a first coolant and an adsorbent, described later, as a first adsorbing substance. The second refrigerating circuit is a chemical-type refrigerating circuit using hydrogen ($H_2$) as a second coolant and an occluding substance, described later, as a second adsorbing substance. However, the second refrigerating circuit 12 may use an adsorbent as the second adsorbing substance, similar to the first refrigerating circuit 11.

The first refrigerating circuit 11 includes an adsorber 13 in which helium gas is adsorbed and released. The adsorber 13 comprises an adsorbent 14, such as activated carbon or zeolite, a heater 15 for heating the adsorbent 14, and a cooler 16. When the temperature of the adsorbent 14 is forcibly raised by the heater 15, the helium gas which has been adsorbed by the adsorbent 14 is released therefrom. On the other hand, when the temperature of the adsorbent 14 is forcibly lowered by the cooler 16, helium gas is adsorbed by the adsorbent 14.

The adsorber 13 having the adsorbent 14 is connected through a connection pipe 17 to a loop-shaped coolant conduit 18. When the adsorbent 14 is heated, helium gas is thus released therefrom into the coolant conduit 18. Then, the helium gas is expanded by a Joule-Thompson expansion valve 19 disposed in the coolant conduit 18. By virtue of the Joule-Thompson effect, at least a part of the helium gas is liquefied, whereby the helium gas is transformed into a mist comprising a mixture of helium gas and liquid helium (hereinafter referred to as "helium gas/liquid helium mixture"). The helium gas/liquid helium mixture is sent to a load cooler 20, constituting a heat load. In the load cooler 20, the mixture cools an object to be cooled to a temperature of approximately 4.2° K., and the liquid helium vaporizes into helium gas.

In the illustrated example, the load cooler has an object to be cooled (hereinafter referred to as "object of cooling") comprising helium gas which has vaporized after cooling a superconducting magnet. However, another construction may be adopted, in which, for example, the load cooler 20 comprises a liquid helium vessel containing a superconducting magnet which is directly cooled.

Subsequently, the adsorbent 14 is cooled so that the helium gas within the coolant conduit 18 is adsorbed by the adsorbent 14.

In order that helium gas be liquefied in the Joule-Thomson expansion valve 19 by the Joule-Thomson effect it is necessary to supply high-pressure helium gas at a temperature below a certain temperature to the Joule-Thomson expansion valve 19, and then discharge the resultant helium gas from the Joule-Thomson expansion valve 19 to the low-pressure side.

For this purpose, a one-way valve 22 is disposed in a high-pressure-side coolant conduit section 18a upstream of the Joule-Thomson expansion valve 19, and another one-way valve 23 is disposed in a low-pressure-side coolant conduit section 18b downstream of the Joule-Thomson expansion valve 19, so as to cause helium gas to flow in one direction and to produce a high pressure in the high-pressure-side coolant conduit section 18a.

In the illustrated example, the one-way valve 22 is not opened until the pressure of the helium gas reaches a set pressure of, for example, 14 atms. With this construction the pressure of the helium gas within the high-pressure-side coolant conduit section 18a is maintained within the range from 14 to 18 atms. Such pressure-maintenance may be achieved not only by means of the one-way valve 22, but also by controlling the amount of the adsorbent 14 (e.g., the amount of active carbon) and/or the heating cycle of the heater 15.

Thus, helium gas released from the adsorbent 14 by heating the adsorbent 14 is sent to the high-pressure side, i.e., the coolant conduit section 18a through the one-way valve 22, and then discharged to the low-pressure side, i.e., the coolant conduit section 18b through the Joule-Thomson expansion valve 19. As described above, when helium gas has been discharged from the Joule-Thomson expansion valve 19, at least part of the helium gas is liquefied. The lower the temperature of the helium gas on the upstream side of the Joule-Thomson expansion valve 19, the lower the temperature of the discharged helium gas becomes and the greater the amount of liquefied helium gas becomes. In view of this fact, first and second heat exchangers 25 and 26 are provided in the high-pressure side coolant conduit section 18a, upstream of the Joule-Thomson expansion valve 19, in order to cool helium gas. A third heat exchanger 27 is provided between the first and the second heat exchangers 25 and 26.

Each of the first and the second heat exchangers 25 and 26 comprises a counterflow heat exchanger, and is adapted to cool the helium gas within the high-pressure-side coolant conduit section 18a by utilizing the relatively low temperature of the helium gas within the low-pressure-side coolant conduit section 18b which has cooled the contents of the load cooler 20. The third heat exchanger 27 utilizes the relatively low temperature hydrogen gas, serving as the second coolant of the second refrigerating circuit 12, after the hydrogen gas has been used in the cooler 16 to cool the adsorbent 14.

Thus, helium gas, at least part of which is liquefied and which forms a helium gas/liquid helium mixture, is sent to the load cooler 20 to cool its contents. Since the boiling point of liquid helium is approximately 4.2° K., the contents of load cooler 20 can be cooled to a temperature of approximately 4.2° K. If the load cooler 20 is disposed in a liquid helium vessel of a superconducting motor, the mixture is used to cool the superconducting magnet. The thus vaporized helium gas is thereafter subjected to liquefaction again.

As described above, the adsorber 13 has the heater 15 for heating the adsorbent 14. The heater 15 is connected to a power circuit 31, and is controlled by a controller, not shown, in such a manner as to intermittently heat the adsorbent 14. The adsorbent 14 is also provided with the cooler 16. A mixture of hydrogen gas and liquid hydrogen (hereinafter referred to as "hydrogen gas/liquid hydrogen mixture") is continuously supplied to the cooler 16 so as to continuously cool the adsorbent 14.

The second refrigerating circuit 12 includes an occluder 33 in which hydrogen gas is occluded by cooling and released by heating. The occluder 33 contains a hydrogen occluding substance 34, such as $LaNi_5$, and a Peltier element 35 for selectively heating and cooling the occluding substance 34. The Peltlet element 35 is connected to the power circuit 31, and is controlled by the controller, not shown, in such a manner as to have its polarity of connection switched to thereby effect heating and cooling within a range of ±60° C. with respect to the ambient temperature. Specifically, when the ambient temperature is maintained at, for example 0° C., the Peltier element 35 is capable of heating to as high as to 60° C. and cooling as low as to −60° C.

Accordingly, if the occluding substance 34 includes a substance capable of occluding at a low temperature of −60° C. or thereabout, it is possible to place the occluder 33 in an atmosphere having a temperature substantially equal to 0° C. Thus, if the occluder 33 is isolated from a cryogenic condition and accommodated in an independent adiabatic structure, it is possible to improve the heat efficiency of the occluder 33.

When the temperature of the occluding substance 34 is forcibly raised by the Peltlet element 35, the hydrogen gas which has been occluded by the occluding substance 34 is released therefrom. On the other hand, when the connection polarity of the Peltier element 35 is switched, and the temperature of the occluding substance 34 is forcibly lowered by the Peltier element 35, hydrogen gas is occluded by the occluding substance 34.

The occluder 33 having the occluding substance 34 is connected through a connecting pipe 37 to a loop-shaped coolant conduit 38. When the occluding substance 34 is heated, hydrogen gas is thus released therefrom into the coolant conduit 38. The hydrogen gas expands upon passage through a Joule-Thomson expansion valve 39 disposed in the coolant conduit 38. By virtue of the Joule-Thomson effect, at least a part of the hydrogen gas is liquefied, whereby the hydrogen gas is transformed into a hydrogen gas/liquid hydrogen mixture. The hydrogen gas/liquid hydrogen mixture is sent to the cooler 16, in which the mixture cools the adsorbent 14 to a temperature of approximately 22° K. Thereafter, a part of the mixture vaporizes into hydrogen gas. At a position downstream of the cooler 16, the third heat exchanger 27 is disposed. The hydrogen gas/liquid hydrogen mixture, after having cooled the coolant 14, is sent to the third heat exchanger 27, in which the mixture cools helium gas whereby another portion of the mixture vaporizes into hydrogen gas.

Subsequently, the connection polarity of the Peltier element 35 is switched to cool the occluding substance 34 so that the hydrogen gas within the coolant conduit 38 is occluded by the occluding substance 34.

In order that hydrogen gas be liquefied in the Joule-Thomson expansion valve 39 by the Joule-Thomson effect, it is necessary to supply high-pressure hydrogen gas at a temperature below a certain temperature to the Joule-Thomson expansion valve 39, and then discharge the resultant hydrogen gas from the expansion valve 39 to the low-pressure side.

For this purpose, a one-way valve 42 is disposed in a high-pressure-side coolant conduit section 38a upstream of the Joule-Thomson expansion valve 39, and another one-way valve 43 is disposed in a low-pressure-side coolant conduit section 38b downstream of the Joule-Thomson expansion valve 39, so as to cause hydrogen gas to flow in one direction and to produce a high pressure in the high-pressure-side coolant conduit section 38a.

Thus, hydrogen gas produced by heating the occluding substance 34 is sent to the high-pressure side, i.e., the coolant conduit section 38a through the one-way valve 42, and then discharged to the low-pressure side, i.e., the coolant conduit section 38b through the Joule-Thomson expansion valve 39. As described above, when hydrogen gas has been discharged from the Joule-Thomson expansion valve 39, at least part of the hydrogen gas is liquefied. The lower the temperature of the hydrogen gas on the upstream side of the Joule-Thomson expansion valve 39 is, the lower the temperature of the discharged hydrogen gas becomes and the greater the amount of liquefied hydrogen gas becomes. In view of this fact, first and second heat exchangers 45 and 46 are provided in the high-pressure-side coolant conduit section 38a, upstream of the Joule-Thomson expansion valve 39, in order to cool the hydrogen gas. A third heat exchanger 47 is provided between the first and the second heat exchangers 45 and 46.

Each of the first and the second heat exchangers 45 and 46 is a counterflow heat exchanger, and is adapted to cool the hydrogen gas within the high-pressure-side coolant conduit section 38a to a temperature of approximately 77° K. by utilizing the relatively low temperature of the hydrogen gas within the low-pressure-side coolant conduit section 38b after the hydrogen gas has been used to cool helium gas in the third heat exchanger 27 of the first refrigerating circuit 11. The third heat exchanger 47 is a liquefied-gas-type cooler employing liquefied gas, for example, liquid nitrogen ($N_2$) as the low-temperature source. For this purpose, a liquefied gas supply means is provided, i.e. the third heat exchanger 47 is connected through a liquid nitrogen conduit 51 to a liquid nitrogen vessel 52.

Liquid nitrogen, whose boiling point is 77° K., has a relatively great latent heat of vaporization per unit weight, and is thus able to provide a great amount of cooling. Accordingly, the supply of a relatively small amount of liquid nitrogen to the third heat exchanger 47 enables sufficient cooling of the hydrogen gas within the high-pressure-side coolant conduit section 38a. Although not shown, the liquid nitrogen conduit 51 is provided with a control valve for controlling the amount of liquid nitrogen supplied. When the liquid nitrogen has cooled hydrogen gas in the third heat exchanger 47, the resultant nitrogen gas is not collected but, rather, is discharged from the third heat exchanger 47 and used to cool the inside of an adiabatic casing 55, described later.

Since the third heat exchanger 47 cools hydrogen gas by utilizing the latent heat of vaporization of liquid nitrogen, it is possible to cool the hydrogen gas so that the joule-Thomson effect will be fully functional. Therefore, even though the second refrigerating circuit 12 uses a refrigerating loop including an occluder 33, it is possible to increase the amount of a hydrogen gas/liquid hydrogen mixture discharged from the Joule-Thomson expansion valve 39. Accordingly, it is possible to reduce the size of the second refrigerating circuit 12, and to achieve a corresponding reduction in the size of the entire apparatus.

Thus, a hydrogen gas/liquid hydrogen mixture, a substantial portion of which is liquefied, is sent to the cooler 16. Since the proportion of the liquid hydrogen in the hydrogen gas/liquid hydrogen mixture is great, it is possible to sufficiently cool the adsorbent in the cooler 16. Consequently, when the adsorbent 14 is heated by turning on the heater 15, without interrupting the supply of hydrogen gas/liquid hydrogen mixture to the cooler 16, such heating does not spoil the cooling ability of the cooler 16, thereby assuring stable heating of the adsorbent 14.

Since the supply of hydrogen gas/liquid hydrogen mixture to the cooler 16 need not be interrupted, an electromagnetic valve or the like is not necessary. Advantageously, temperatures need not be detected under cryogenic conditions, thereby improving controllability. Further, a section of such an electromagnetic valve need not be separately maintained at normal temperature, thereby enabling a reduction in the size of the entire apparatus.

After the hydrogen gas/liquid hydrogen mixture has left the cooler 16, the mixture is sent to the third heat exchanger 27 of the first refrigerating circuit 11, in which the mixture is used to cool helium gas. Since the boiling temperature of liquid hydrogen is approximately 22° K. the cooler 16 is able to cool the adsorbent 14 to a temperature of approximately 22° K., while the third heat exchanger 27 is able to cool helium gas to a temperature of approximately 22° K.

In the first refrigerating circuit 11, hydrogen gas/liquid hydrogen mixture at a temperature of approximately 22° K. is used to create a cryogenic condition of approximately 4.2° K. in the load cooler 20. Therefore, all components of the first refrigerating circuit 11, that is, the adsorber 13, the coolant conduit 18, the Joule-Thomson expansion valve 19, the load cooler 20, the one-way valves 22 and 23, and the first, the second and the third heat exchangers 25, 26 and 27, should be insulated from ambient temperature. In the second refrigerating circuit 12, an atmosphere of approximately 0° C. is used to create a cryogenic condition of approximately 22° K. in the cooler 16. Therefore, those components of the second refrigerating circuit 12 other than the occluder 33, that is, the coolant conduit 38, the Joule-Thomson expansion valve 39, the one-way valves 42 and C3, and the first, the second and the third heat exchangers 45, 46 and 47, should be insulated from ambient temperature. Further, the liquid nitrogen vessel 52 and the liquid nitrogen conduit 51, used to cool the third heat exchanger 47 with liquid nitrogen, should be insulated from ambient temperature.

For such insulation, an adiabatic casing 55 is provided, as indicated by broken lines in FIG. 1, so as to isolate the above listed components from ambient temperature. In addition, nitrogen gas, which has vaporized as a result of cooling hydrogen gas in the third heat exchanger 47, is discharged to the inside of the adiabatic casing 55 so as to utilize the relatively low temperature of the nitrogen gas. With this construction, in order to ensure the function of the Peltier element 35 of the occluder 33, the occluder 33 is disposed outside the adiabatic casing 35.

For the operation of the Peltier element 35, it is necessary to maintain an ambient temperature of, in this example, 0° C. Therefore, the occluder 33 is enclosed by an auxiliary adiabatic casing 56, as indicated by one-dot-chain lines in FIG. 1, so as to isolate the occluder 33 from ambient temperature. Consequently, only the power circuit 31 is exposed to the ambient atmosphere. With this construction, the interior of the adiabatic casing 55 is connected with the ambient atmosphere only through electric wiring 58. The interior of the adiabatic casing 55 and the interior of the auxiliary adiabatic casing 56 are interconnected only at a point b through a connecting pipe 37 connecting the one-way valves 42 and 43 with the occluding substance 34, and the interior of the auxiliary adiabatic casing 56 is connected with the ambient atmosphere only at a point c, through an electric wiring 61. Thus, the heat insulation effect is improved.

While the occluding substance 34 is not operated under cryogenic conditions, the adsorbent 14 is favorably operated under cryogenic conditions. Therefore, the first refrigerating circuit 11 is operated under cryogenic conditions, and the second refrigerating circuit 12 is operated in a higher temperature region than the first refrigerating circuit 11, so that the substance to be cooled is cooled to a cryogenic state in a two stage refrigerating cycle. In this construction, while the occluding substance 34 is used in a relatively high temperature region, the adsorbent is used in a low temperature region. The lower temperature at which the adsorbent 14 is used, the more helium gas it adsorbs and the smaller the apparatus can be made correspondingly.

A second embodiment of a cryogenic refrigerator according to the present invention will be described with reference to FIG. 2 which shows the apparatus as again including a first refrigerating circuit 11 and a second refrigerating circuit 12. The first refrigerating circuit 11 comprises an adsorber 13 containing an adsorbent 14, a heater 15 and a cooler 16. The first refrigerating circuit 11 also comprises a coolant conduit 18, a Joule-Thomson expansion valve 19 disposed in the coolant conduit 18, a load cooler 20, first and the second heat exchangers 25, 26 for cooling helium gas, a third heat exchanger 27, and a power circuit 31 for sending electric current to the heater 15.

The second refrigerating circuit 12 comprises an occluder 33 containing an occluding substance 34 and a Peltier element 35 for selectively heating and cooling the occluding substance 34. The Peltier element 35 is connected to a power circuit 31. The second refrigerating circuit 12 also comprises a coolant conduit 38 having a high-pressure-side coolant conduit section 35a and a low-pressure-side coolant conduit section 38b, a Joule-Thomson expansion valve, a one-way valve 42 disposed in the high-pressure-side coolant conduit section 38a upstream of the Joule-Thomson expansion valve 39, a one-way valve 43 disposed in the low-pressure-side coolant conduit section 38b downstream of the Joule-Thomson expansion valve 39, first and the second exchangers 45, 46 and a third heat exchanger disposed between the first and the second heat exchangers 45 and 46. The third heat exchanger 47, adapted to utilize the relatively low temperature of liquid nitrogen, is connected to a liquid nitrogen vessel 52 through a liquid nitrogen conduit 51.

Figure 2:
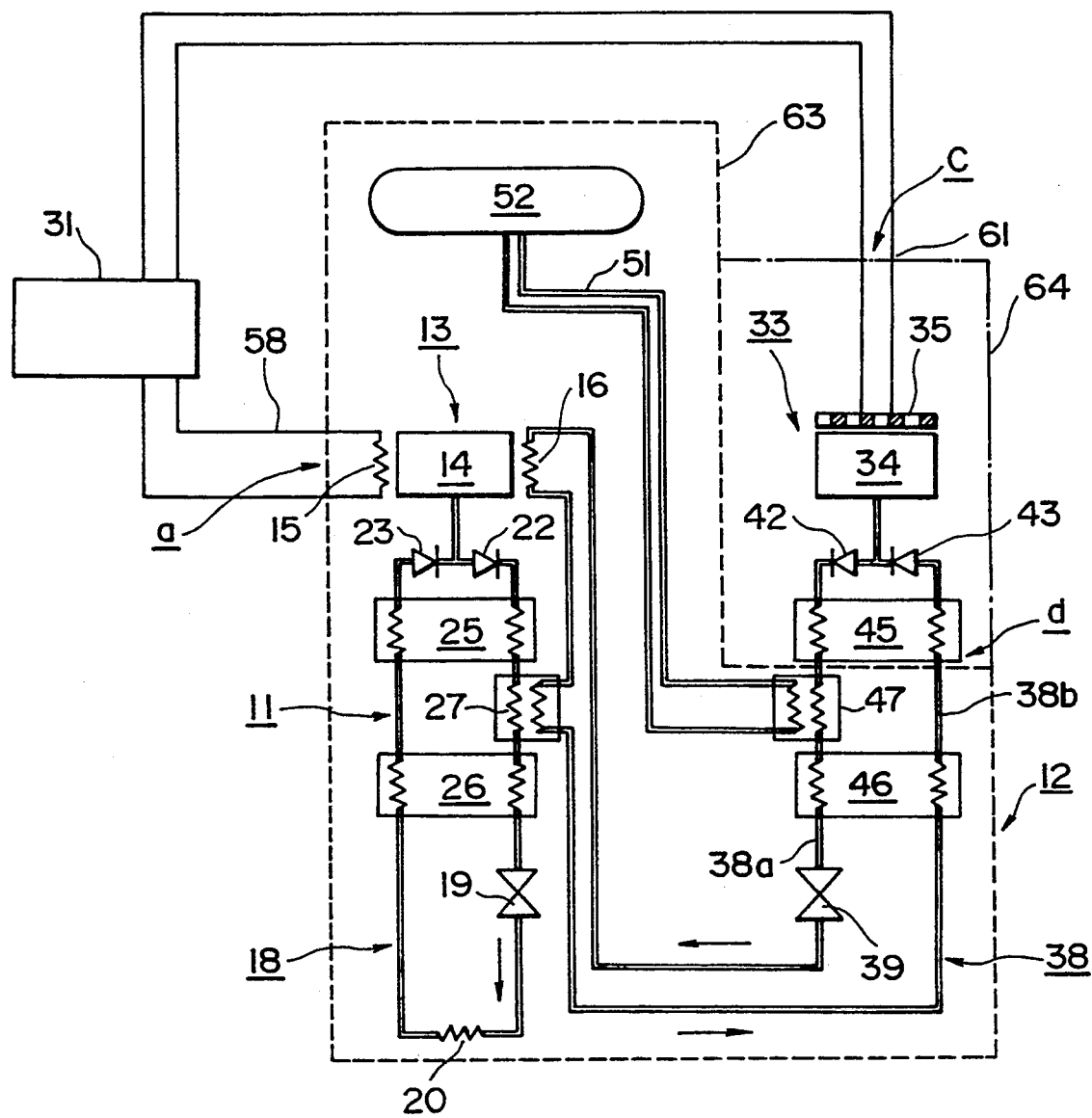
FIG. 2 is a schematic diagram showing a cryogenic refrigerator according to a second embodiment of the present invention.

In the second embodiment, as indicated by broken lines in FIG. 2, an adiabatic casing 63 houses the following: all components of the first refrigerating circuit 11, that is, an adsorber 13, a coolant conduit 18, a Joule-Thomson expansion valve 19, a load cooler 20, one-way valves 22 and 23, and the first, the second and the third heat exchangers 25, 26 and 27; some of the components of the second refrigerating circuit 12, that is, a coolant conduit 38, a Joule-Thomson expansion valve 39, and the second and the third heat exchangers 46 and 47; the liquid nitrogen vessel 52; and the liquid nitrogen conduit 51, so that these components are insulated from ambient temperature.

On the other hand, the occluder 33 is disposed outside the adiabatic casing 63 in order to assist the functioning of the Peltier element 35 of the occluder 33. In addition, the first heat exchanger 45 and the one-way valves 42 and 43 are disposed outside the adiabatic casing 63. In this embodiment, since the first heat exchanger 45, which operates at a relatively high temperature range, is disposed outside the adiabatic casing 63, it is possible to maintain the interior of the adiabatic casing 63 at a still lower temperature.

To maintain an ambient temperature of 0° C. for functioning the Peltlet element 35, the occluder 33, the first heat exchanger 45 and the one-way valves 42 and 43 are enclosed by an auxiliary adiabatic casing 64, as indicated by one-dot-chain lines in FIG. 2, so as to isolate these components from ambient temperature. Consequently, only the power circuit 31 is located in the ambient atmosphere. With this construction, the interior of the adiabatic casing 63 is connected with the ambient atmosphere only through an electric wiring 58. The interior of the adiabatic casing 63 and the interior of the auxiliary adiabatic casing 64 are interconnected only at a point d through the high-pressure-side coolant conduit section 38a interconnecting the first and the third heat exchangers 45 and 47 and the low-pressure-side coolant conduit section 38b interconnecting the first and the second heat exchangers 45 and 46, and the interior of the auxiliary adiabatic casing 64 communicates with the ambient atmosphere only at a point c through an electric wiring 61. In this way, the heat insulation effect is improved.

Figure 3:
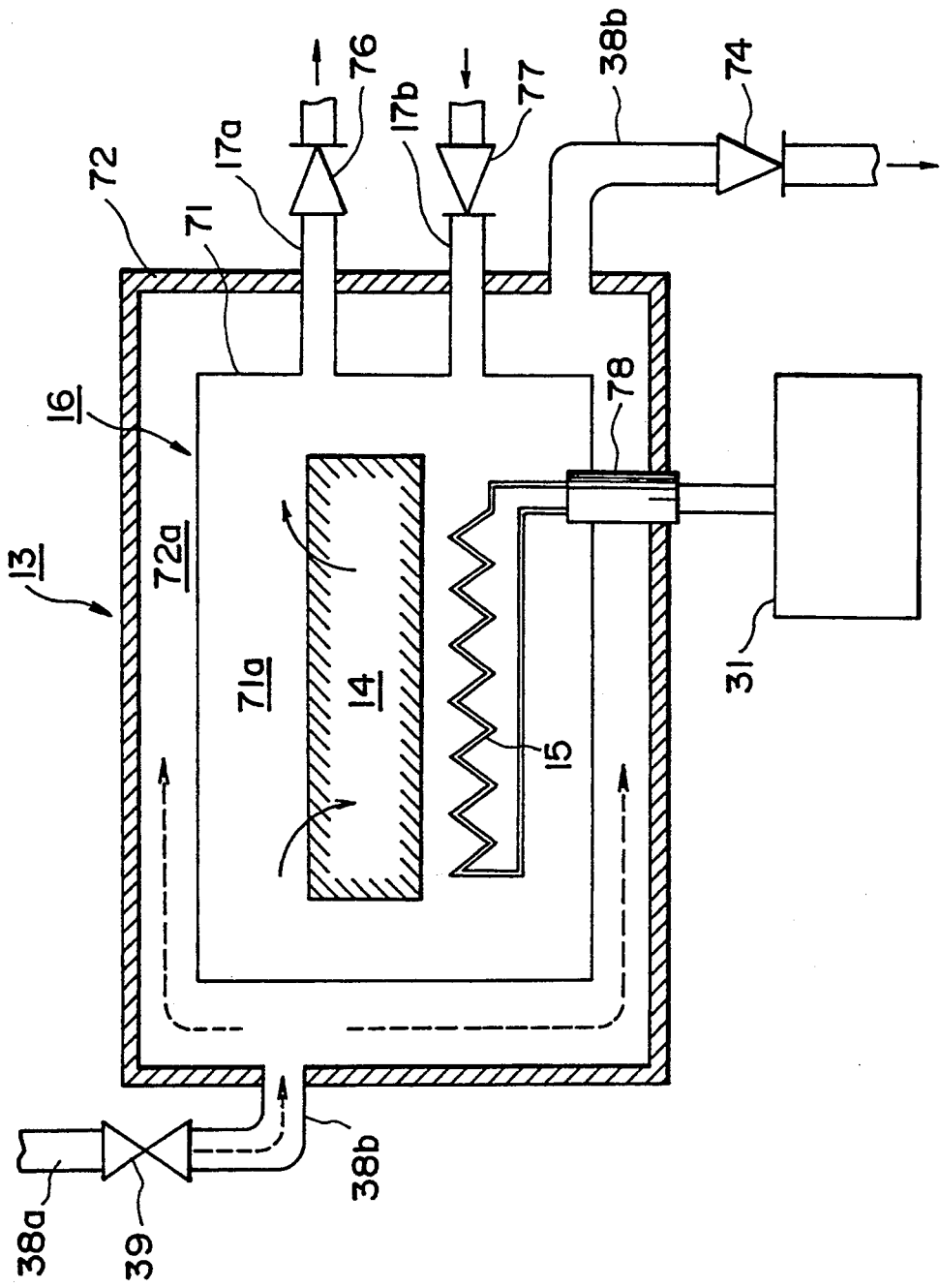
FIG. 3 is a cross-sectional view schematically showing an adsorber which may be included in an embodiment of the present invention.

Referring to FIG. 3, an adsorber 13 includes a body of adsorbent 14, and a heater 15 for heating the adsorbent body 14. The adsorbent body 14 and the heater 15 are enclosed in an inner vessel 71. The inner vessel 71 itself is enclosed in an outer vessel 72. A helium coolant chamber 71a, in which the adsorbent 14 adsorbs and releases helium gas, is formed in the interior of the inner vessel 71. A hydrogen coolant chamber 72a, into which a hydrogen gas/liquid hydrogen mixture is supplied, is formed between the inner vessel 71 and the outer vessel 72. The helium coolant chamber 71a, the hydrogen coolant chamber 72a and the inner vessel 71 together constitute a cooler 16. For this purpose, the inner vessel 71 is made of a material having a high thermal conductivity.

The hydrogen gas/liquid hydrogen mixture within the hydrogen coolant chamber 72a cools the helium gas and the adsorbent 14 within the helium coolant chamber 71a through the inner vessel 71, whereby a part of the liquid hydrogen vaporizes. In order to prevent heat from penetrating into the hydrogen coolant chamber 72a, the outer vessel 72 is made of a material having a high heat-insulating value.

The outer vessel 72 is connected with a low-pressure-side coolant conduit section 38b so that, after hydrogen gas/liquid hydrogen mixture has been supplied into the hydrogen coolant chamber 72a, and the adsorbent 14 has thereby been cooled, the resultant hydrogen gas, including a newly vaporized portion, is returned to an occluder 33 (such as that shown in FIG. 1). A Joule-Thomson expansion valve 39 is disposed in the low-pressure-side coolant conduit section 38b at a position upstream of the outer vessel 72, and a one-way valve 74 is disposed in the low-pressure-side coolant conduit section 38b at a position downstream of the outer vessel 72.

A connecting pipe 17a is provided to supply helium gas generated in the helium coolant chamber 71a to a Joule-Thomson expansion valve 19 of a first refrigerating circuit 11 (such as that shown in FIG. 1), while a connecting pipe 17b is provided to return helium gas, which has cooled the load cooler 20, to the helium coolant chamber 71a. One way valves 76 and 77 are disposed in the connecting pipes 17a and 17b, respectively.

Although the adsorbent body 14 shown in FIGS. 1 and 2 is illustrated as being connected with the one-way valves 22 and 23 by a single connecting pipe 17, in an actual apparatus, the adsorbent 14 is connected with the one-way valves 76 and 77 by the connecting pipes 17a and 17b, respectively, as shown in FIG. 3.

The adsorbent body 14 is heated by the heater 15 disposed adjacent thereto. The heater 15 is connected to a power circuit 31 via a connector 78, and is controlled by a controller, not shown.

The operation of the adsorber 13 will be described with reference to FIG. 4. FIG. 4 only schematically shows various values, and their changes are different from actual changes.

Figure 4A:
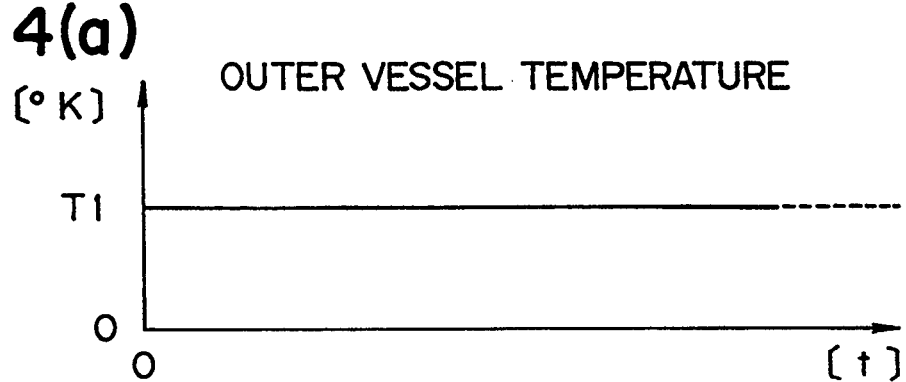
FIG. 4(a) is a graph showing changes in the temperature of an outer vessel.

The hydrogen gas/liquid hydrogen mixture formed by a Joule-Thomson expansion valve 39 of the second refrigerating circuit 12 is (FIG. 1) continuously supplied through the low-pressure-side coolant conduit section 38b into the hydrogen coolant chamber 72a. Since the liquid hydrogen of the hydrogen gas/liquid hydrogen mixture cools the adsorbent body 14, the temperature of the hydrogen coolant chamber 72a, that is, the outer vessel temperature T1 remains constant as shown in the graph of FIG. 4(a).

Figure 4B:
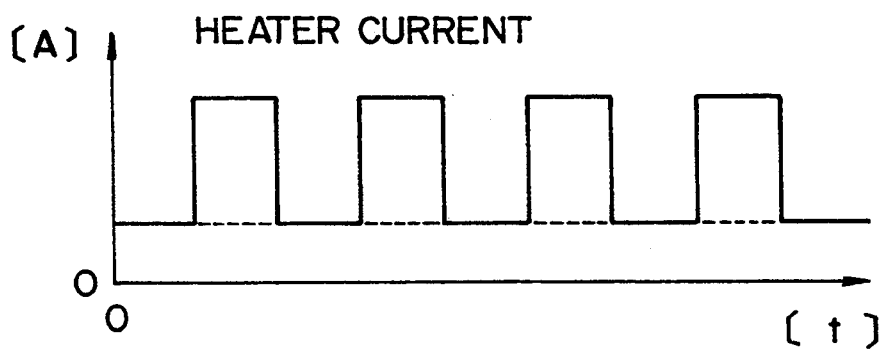
FIG. 4(b) is a graph showing changes in heater current.

The heater 15 is controlled by the controller in such a manner that the heater 15 is intermittently turned on and off. Thus, the electric current of the heater 15 changes as shown in the graph of FIG. 4(b).

Figure 4C:
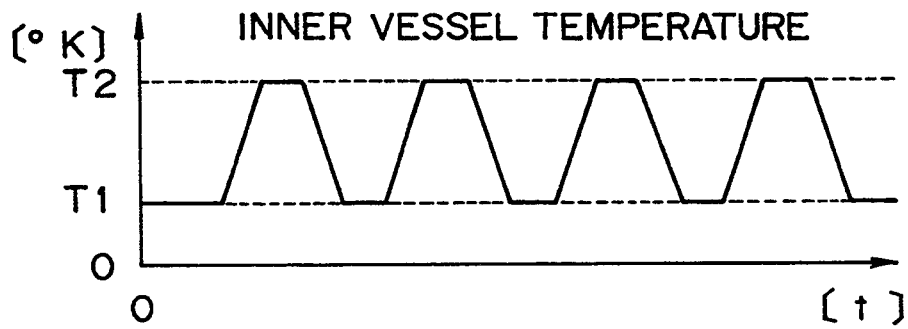
FIG. 4(c) is a graph showing changes in the temperature of inner vessels.

As the heater 15 intermittently effects heating, the temperature of the helium coolant chamber 71a, that is, the inner vessel temperature, rises to level T2 only while the heater 15 is turned on. When the heater 15 is turned off, the inner vessel temperature drops to the level T1 which is the outer vessel temperature. Thus, the inner vessel temperature changes as shown in the graph of FIG. 4(c).

Figure 4D:
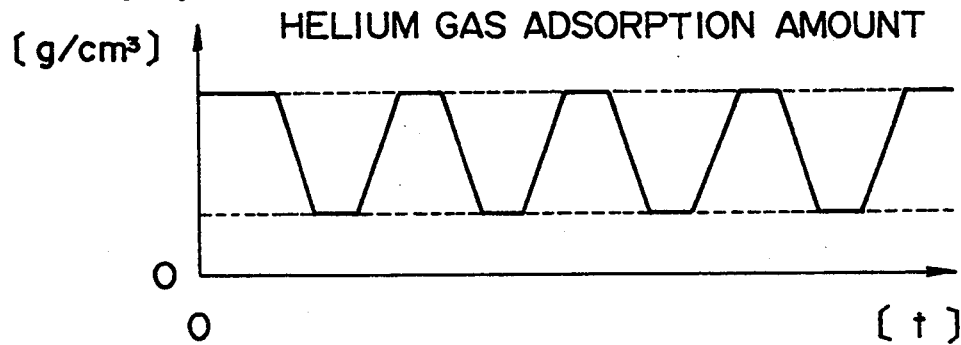
FIG. 4(d) is a graph showing changes in the amount of adsorption of helium gas.

As the inner vessel temperature repeatedly rises and drops, the amount of adsorption of helium gas by the adsorbent 14 changes in correspondence with these changes in the inner vessel temperature, as shown in the graph of FIG. 4(d). When the inner vessel temperature rises, helium gas is released, causing a reduction in the adsorption amount. When the inner vessel temperature drops, helium gas is adsorbed, causing an increase in the adsorption amount.

Figure 5:
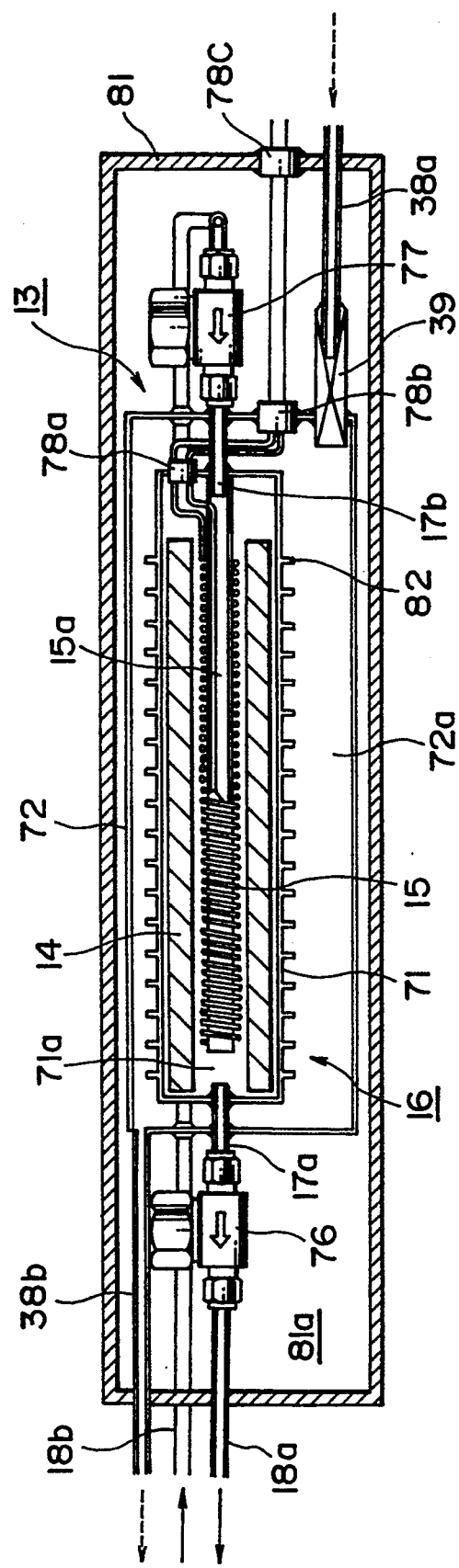
FIG. 5 is a cross-sectional view of an adsorber which may be included in the present invention.

Referring to FIG. 5, an adsorber 13 is encased in an adsorber housing 81. The adsorber casing 81 is made of a heat insulating material. The space between the adsorber housing 81 and an outer vessel 72 forms a heat insulating chamber 81a, in which one-way valves 76 and 77 are disposed. An inner vessel 71 made of a material having a high thermal conductivity is arranged inside the outer vessel 72 with a hydrogen coolant chamber 72a being formed therebetween. The inner vessel 71 is a hollow cylinder, and has a plurality of annular fins 82 formed thereon. The annular fins 82 radially project into the hydrogen coolant chamber 72a, so as to achieve good transfer of heat from the hydrogen gas/liquid hydrogen mixture.

A helium coolant chamber 71a is formed inside the inner vessel 71 and contains a hollow cylindrical body of adsorbent 14. The adsorbent 14 extends along the inner vessel 71 substantially over the full length thereof, with a heater 15 being arranged inside the adsorbent 14. The heater 15 is disposed around a hollow cylindrical support 15a having a porous peripheral surface. The adsorbent 14 is a hollow cylinder. The heater 15 is disposed along the inner periphery of the adsorbent 14, so as to achieve good heating efficiency.

A connecting pipe 17a penetrates one end (left, as viewed in FIG. 5) of each of the inner vessel 71 and the outer vessel 72, and opens into the interior of the helium coolant chamber 71a. Another connecting pipe 17b is disposed penetrating the other end (right) of each of the inner vessels 71 and the outer vessel 72, and opens into the interior of the support 15a of the heater 15. With this construction, helium gas generated by heating the adsorbent 14 is discharged through the connecting pipe 17a, while helium gas to be adsorbed by cooling the adsorbent 14 is introduced through the connecting pipe 17b, and sprayed through the pores of the support 15a onto the inner periphery of the adsorbent 14.

The connecting pipes 17a and 17b are connected with one-way valves 76 and 77, respectively. The other ends of the one-way valves 76 and 77 are connected with high-pressure-side coolant conduit section 18a and low-pressure-side coolant conduit section 18b, respectively, of a first refrigerating circuit 11 (such as that shown in FIG. 1). The high-pressure-side coolant conduit section 18a and the low-pressure-side coolant conduit section 18b extend through a wall at the corresponding end of the adsorber housing 81 for connection to a first heat exchanger 25. Since the low-pressure-side coolant conduit section 18b extends, as shown in FIG. 5, from one end of the heat insulating chamber 81 to the other end of the same and connect with the corresponding one-way valve 77, an intermediate portion of the coolant conduit section 18b passes through the inside of the hydrogen coolant chamber 72a. This is advantageous not only in that the required piping space can be reduced, thereby enabling a corresponding reduction in the size of the adsorber 13, but also in that the helium gas before adsorption by the adsorbent 14 can be cooled, thereby promoting the adsorption.

A low-pressure-side coolant conduit section 38b of a second refrigerating circuit 12 is connected to one end of the outer vessel 72. The low-pressure-side coolant conduit section 38b opens into the hydrogen coolant chamber 72a, and extends through a wall at the corresponding end of the adsorber housing 81 for connection with a third heat exchanger 27. With this construction, the hydrogen gas within the hydrogen coolant chamber 72a which has cooled the adsorbent is sent to the third heat exchanger through the low-pressure side coolant conduit section 38b. A high-pressure-side coolant conduit section 38a is connected to the other end of the outer vessel 72. The high-pressure-side coolant conduit section 38a opens into the hydrogen coolant chamber 72a through a Joule-Thomson expansion valve 39, and extends through the corresponding end of the adsorber housing 81 to be connected to the second heat exchanger 46. With this construction, a hydrogen/liquid hydrogen mixture discharged from the Joule-Thomson expansion valve 39 is directly supplied into the hydrogen coolant chamber 72a.

The heater 15 disposed facing the inner periphery of the adsorbent 14 is connected to a power circuit 31, and intermittently turned on by a controller, not shown, to heat the adsorbent 14. For this purpose, the heater 15 is electrically connected to the power circuit 31 by wirings extending through walls of the inner vessel 71, the outer vessel 72 and the adsorber housing 81. Connectors 78a, 78b and 78c are provided in the corresponding walls of the inner vessel 71, the outer vessel 72 and the adsorber housing 81.

Next, an example of an adsorber 13 will be described, in which a heat pipe is used in a cooler 16 of the adsorber 13.

Figure 6:
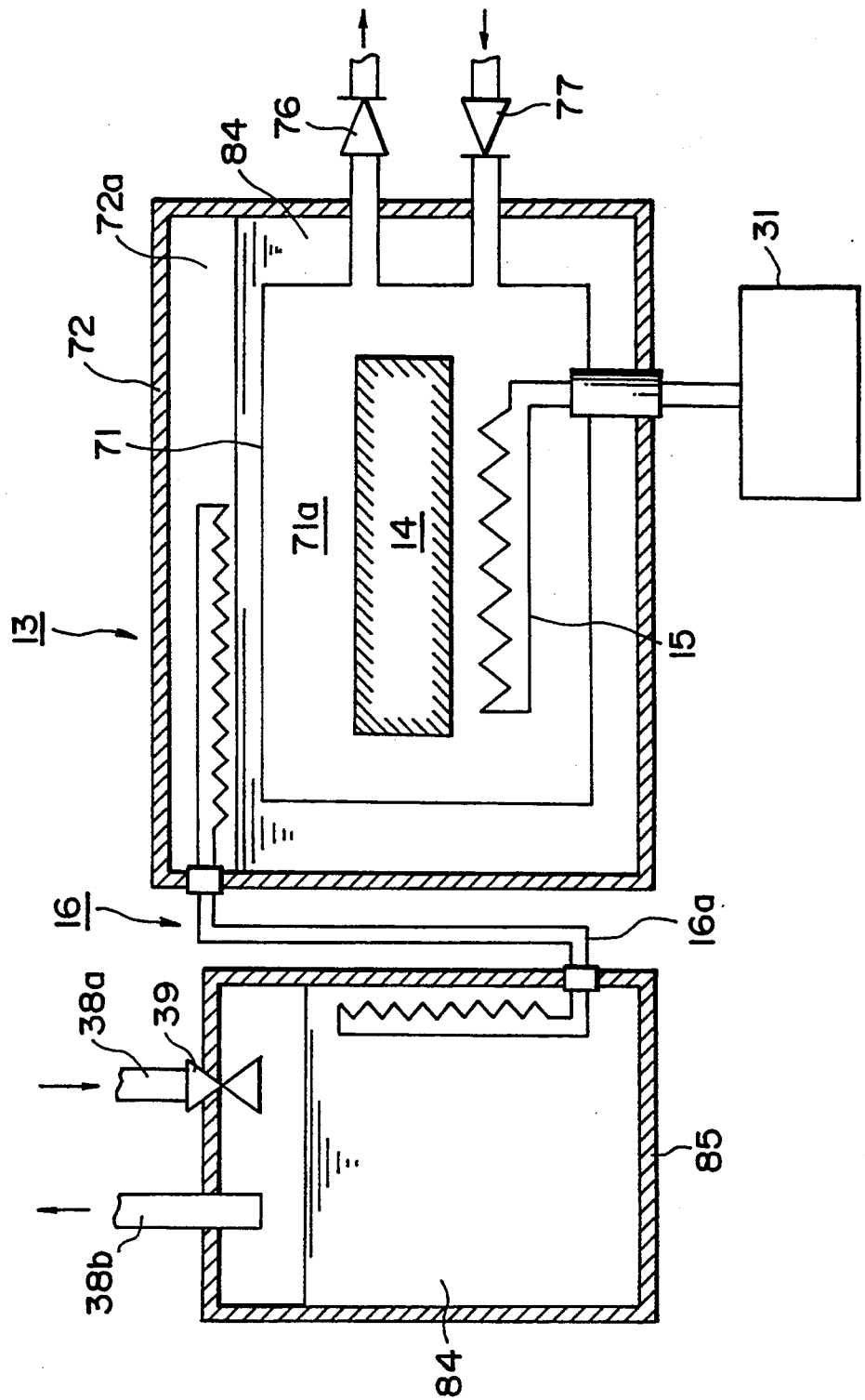
FIG. 6 is a cross-sectional view schematically showing another adsorber which may be included in an embodiment of the present invention.

Referring to FIG. 6, an inner vessel 71 is disposed in an outer vessel 72 with a hydrogen coolant chamber 72a being formed therebetween. Liquid hydrogen 84 is charged in the hydrogen coolant chamber 72a, and the entire inner vessel 71 is submerged in the liquid hydrogen 84 within the hydrogen coolant chamber 72a.

A liquid hydrogen vessel 85 stores liquid hydrogen 84. The liquid hydrogen vessel 85 is connected with a high-pressure side coolant conduit section 38a through a Joule-Thomson expansion valve 39 so that a hydrogen gas/liquid hydrogen mixture is discharged from the Joule-Thomson expansion valve 39.

A heat pipe 16a connects the outer vessel 72 with the liquid hydrogen vessel 85 in such a manner that the heat pipe 16a, liquid hydrogen 84 within the hydrogen coolant chamber 72a and the inner vessel 71 together constitute a cooler 16. Under certain conditions of temperature and pressure, hydrogen gas or liquid hydrogen alone may be discharged from the Joule-Thomson expansion valve 39.

Since the entire outer surface of the inner vessel 71 is covered with liquid hydrogen 84 at a temperature of 22° K., there is less variation in temperature than there is in the case where a hydrogen gas/liquid hydrogen mixture is supplied into the hydrogen coolant chamber 72a, thereby making it possible to uniformly cool the entire inner vessel 71. Further, because the liquid hydrogen 84 can vaporize on the entire outer surface of the inner vessel 71, it is possible to improve cooling ability so that, when a heater 15 is turned off, an adsorbent body 14 is more quickly cooled.

Although in the illustrated example, the Joule-Thomson expansion valve 39 is disposed opening into the interior of the liquid hydrogen vessel 85, the Joule-Thomson expansion valve 39 may be connected with a low-pressure-side coolant conduit section 38b so as to cause heat exchange with the liquid hydrogen 84 within the liquid hydrogen vessel 85.

Next will be described an embodiment in which a plurality of adsorbent bodies 14 are provided, and in which each adsorbent body 14 is heated and cooled alternately so that it is possible to smooth the amounts of generation and adsorption of helium gas. Although in the illustrated example, the embodiment includes three adsorbent bodies 14, a suitable number of adsorbent bodies 14, which is two or greater, is selected in accordance with a desired degree of flow fluctuation.

Figure 7:
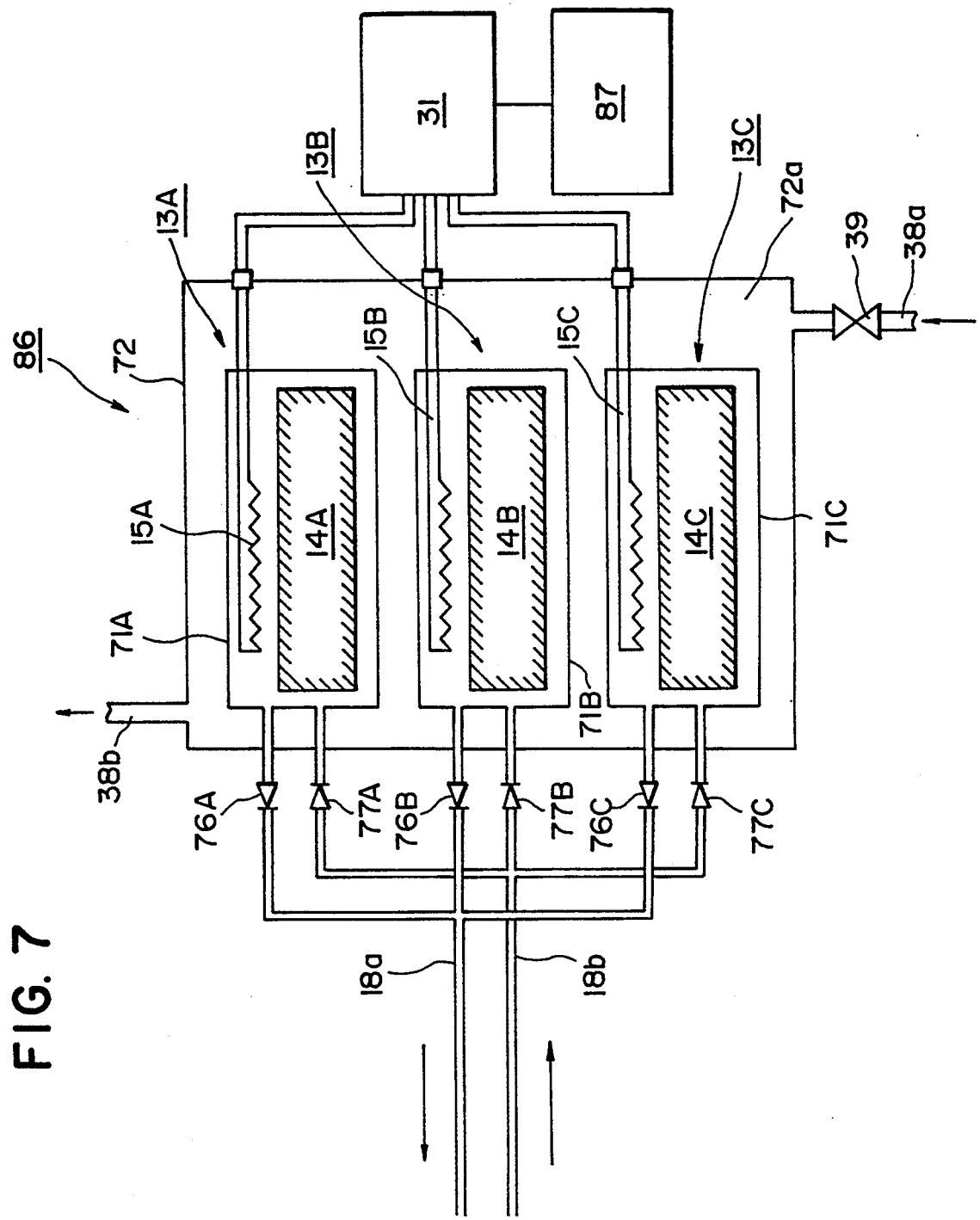
FIG. 7 is a schematic diagram showing a multiplex adsorber which may be included in an embodiment of the present invention.

Referring to FIG. 7, a multiplex adsorber 86 comprises three adsorber units 13A, 13B and 13C, in a single outer vessel 72 containing three inner vessels 71A, 71B, and 71C arranged in parallel. The inner vessels 71A, 71B and 71C respectively accommodate adsorbent bodies 14A, 14B and 14C as well as heaters 15A, 15B and 15C. The heaters 15A, 15B and 15C are connected to a power circuit 31, and are controlled to be alternately turned on by a control circuit 87.

The inner vessels 71A, 71B and 71C are connected with one-way valves 76A, 76B and 76C, respectively, and connected through the one-way valves 76A, 76B and 76C to a common high-pressure-side coolant conduit section 18a. Similarly, the inner vessels 71A, 71B and 71C are connected through the one-way valves 77A, 77B and 77C, respectively, to a common low-pressure-side coolant conduit section 18b.

A common hydrogen coolant chamber 72a is formed in the outer vessel 72, and is supplied with a hydrogen gas/liquid hydrogen mixture discharged from a Joule-Thomson expansion valve 39 so as to continuously cool the inner vessels 71A, 71B and 71C. With this construction, when the heaters 15A, 15B and 15C are alternately turned on to thereby alternately heat the adsorbent bodies 14A, 14B and 14C, helium gas is generated from the heated absorbent body 14A, 14B or 14C, and supplied into a high-pressure-side coolant conduit section 18a. At this time, the non-heated adsorbent bodies 14A, 14B and/or 14C are cooled by the hydrogen gas/liquid hydrogen mixture within the hydrogen coolant chamber 72a so as to adsorb helium gas supplied through the low-pressure-side coolant conduit section 18b.

The one-way valves 76A, 76B and 76C are not opened until the pressure of the helium gas reaches a set pressure of, for example, 14 atms. Therefore, when the internal pressure within the inner vessel(s) 71A, 71B and 71C has reached the set pressure, helium gas is automatically discharged therefrom.

Figure 8:
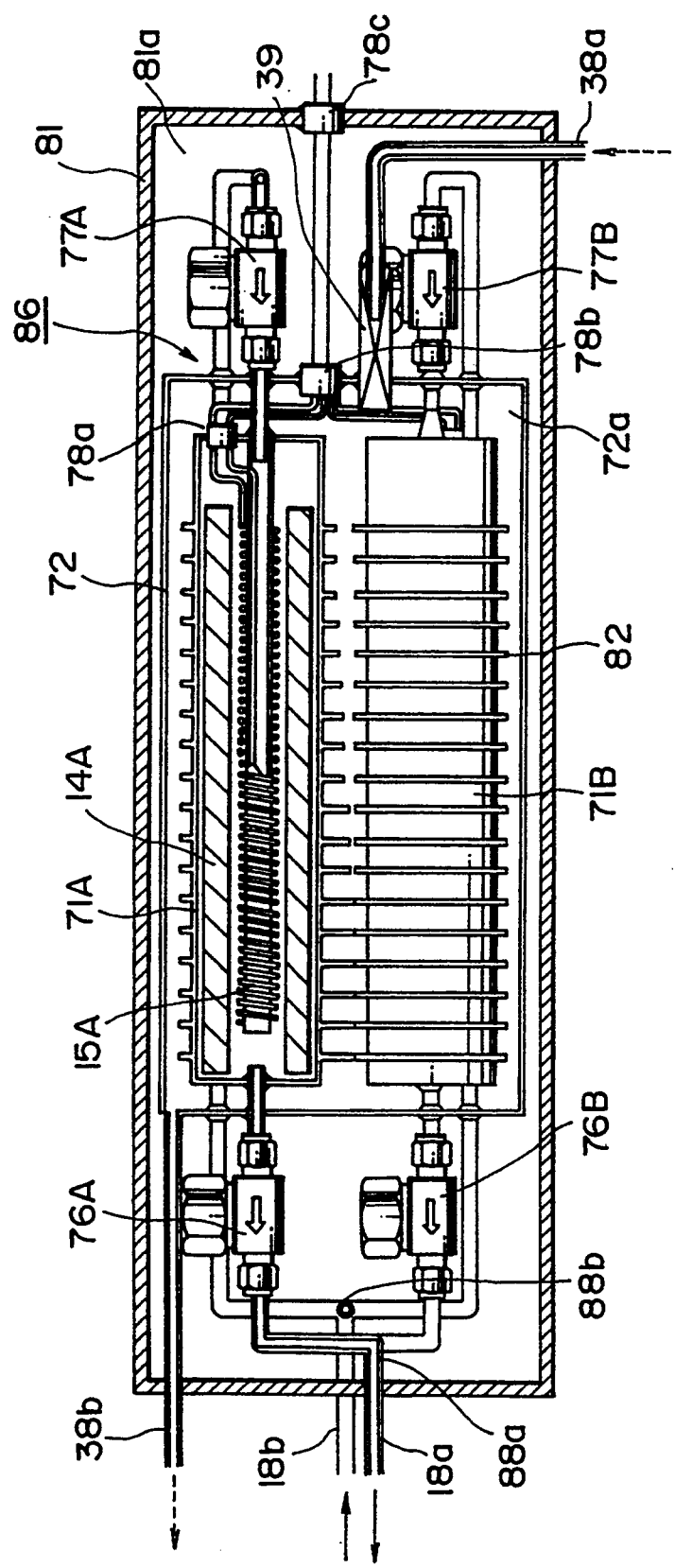
FIG. 8 is a cross-sectional view of a multiplex adsorber which may be used in an embodiment of the present invention.

A construction of the multiplex adsorber 86 will be described with reference to FIG. 8. Although FIG. 8 shows only adsorber units 13A and 13B from among three adsorber units 13A, 13B and 13C, the adsorbent units 13A, 13B and 13C are, in fact, arranged in an equilateral-triangular shape.

Three adsorber units 13A, 13B and 13C, constituting a multiplex adsorber 86, are encased in an adsorber housing 81. The adsorber casing 81 is made of a heat insulating material, and the space between the adsorber housing 81 and an outer vessel 72 forms a heat insulating chamber 81a, in which one-way valves 76A, 76B and 76C and one-way valves 77A, 77B and 77C are disposed. Inner vessels 71A, 71B and 71C made of a material having a high thermal conductivity are arranged inside the outer vessel 72 with a hydrogen coolant chamber 72a being formed therebetween. The inner vessels 71A, 71B and 71C are hollow cylinders, being arranged in a triangular shape, and have a plurality of annular fins 82 formed thereon. The annular fins 82 radially project into the hydrogen coolant chamber 72a, so as to achieve good transfer of heat from hydrogen gas/liquid hydrogen mixture. The more leftward fins 82 project the more toward the center of the triangular shape, as viewed in FIG. 8, in the longitudinal direction of the inner vessels 71A, 71B and 71C.

Hollow cylindrical adsorbent bodies 14A, 14B and 14C are arranged inside the inner vessels 71A, 71B and 71C, respectively, and heaters 15A, 15B and 15C are disposed inside the adsorbent bodies 14A, 14B and 14C, respectively.

The one-way valves 76A, 76B and 76C are connected with a common high-pressure-side coolant conduit section 18a, while the one way valves 77A, 77B and 77C are connected with a common low-pressure-side coolant conduit section 18b. A joint 88b at which the one-way valves 76A, 76B and 77C are connected with the high-pressure-side coolant conduit section 18a as well as a joint 88b at which the one-way valves 77A, 77B and 77C are connected with the low-pressure-side coolant conduit section 18b are disposed in the heat insulating chamber 81a.

A low-pressure-side coolant conduit section 38b of a second refrigerating circuit 12 (such as that shown in FIG. 1) is connected to one end of the outer vessel 72, and opens into the hydrogen coolant chamber 72a. A high-pressure-side coolant conduit section 38a is connected to the other end of the outer vessel 72, and opens into the hydrogen coolant chamber 72a through a Joule-Thomson expansion valve 39. The Joule-Thomson expansion valve 39 is disposed at a substantially central location of a wall at the other end of the outer vessel 72. With this construction, a hydrogen/liquid hydrogen mixture discharged from the Joule-Thomson expansion valve 39 is directly supplied into the hydrogen coolant chamber 72a for contact with the fins 82 of the inner vessels 71A, 71B and 71C. In this process, since the more leftward fins 82 project further toward the center of the triangular shape, it is possible to cool the inner vessels 71A, 71B and 71C uniformly in the longitudinal direction thereof.

The heaters 15A, 15B and 15C disposed inside the adsorbent bodies 14A, 14B and 14C are connected to a power circuit 31 (see FIG. 7), and are intermittently turned on by a controller 87 to heat the adsorbent bodies 14A, 14B and 14C. For this purpose, the heaters 15A, 15B and 15C are electrically connected to the power circuit 31 by wirings extending through walls of the inner vessels 71A, 71B, 71C, the outer vessel 72 and the adsorber housing 81. A connector 78a is necessary for each of the inner vessels 71A, 71B and 71C, while connectors 78b and 78c are provided commonly with respect to the adsorber units 13A, 13B and 13C, thereby decreasing the need for sealing.

Next, an embodiment, in which heating is performed without providing the adsorbent body 14 with a heater 15, will be described.

Figure 9:
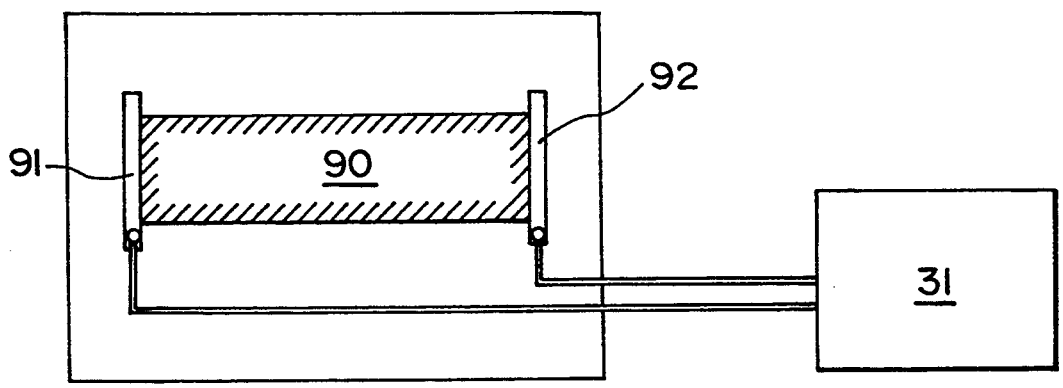
FIG. 9 is a schematic diagram showing another example of an adsorber which may be included in an embodiment of the present invention.

Referring to FIG. 9, a pair of electrodes 91 and 92 are disposed on opposing ends of an adsorbent body 90. The adsorbent body 90, which comprises, for example, activated carbon, is an electrical conductor, and capable of generating heat when supplied with current. In this embodiment, the adsorbent 90 itself is connected to a power device 31 through the electrodes 91 and 92 so that, when current is supplied to the adsorbent body 90, the adsorbent body 90 is able to generate heat to thereby generate helium gas.

It is to be understood that the present invention is not intended to be limited to the above-described embodiments, and various changes may be made therein without departing from the spirit of the present invention. Such changes are also included in the scope of the present invention.

What we claim is:

1. A cryogenic refrigerator comprising:
   (a) an adsorbent body;
   (b) heating means for heating said adsorbent body;
   (c) an inner vessel containing said adsorbent body and means for heating said adsorbent body and forming a first coolant chamber;
   (d) an outer vessel containing said inner vessel with a second coolant chamber formed between said inner vessel and said outer vessel;
   (e) a one-way valve for discharging a first coolant from said first coolant chamber;
   (f) a one-way valve for feeding the first coolant back to said first coolant chamber;
   (g) means for continuously circulating a second coolant through said second coolant chamber; and
   (h) means for intermittently actuating said heating means.

2. A cryogenic refrigerator comprising:
   (a) a plurality of bodies of adsorbent;
   (b) a plurality of heating means, each of said heating means being mounted in association with one of said plurality of bodies of adsorbent, for independently heating the associated body of adsorbent;
   (c) a plurality of inner vessels, each independently accommodating one of said bodies of adsorbent and one of said heating means and forming therein first coolant chambers;
   (d) a single outer vessel containing said plurality of inner vessels with a common second coolant chamber formed between said inner vessels and said outer vessel;
   (e) a plurality of one-way valves, each communicating with one of said first coolant chambers, through which a first coolant can be independently discharged from each of said first coolant chambers;
   (f) a plurality of one-way valves, each communicating with one of said first coolant chambers, through which the first coolant can be independently fed back to each of said first coolant chambers;
   (g) means for continuously circulating a second coolant through said second coolant chamber; and
   (h) means for alternately and intermittently actuating said plurality of heating means.

3. A cryogenic refrigerator according to claim 1, wherein said heating means comprises a heater disposed adjacent to said adsorbent body, and a power circuit for supplying electric current to said heater.

4. A cryogenic refrigerator according to claim 2, wherein each of said heating means comprises a heater disposed adjacent to said associated body of adsorbent, and a power circuit for supplying electric current to said heater.

5. A cryogenic refrigerator according to claim 1, wherein said heating means comprises a pair of electrodes provided on said adsorbent body, and a power circuit connected to said electrodes for supplying electric current to said adsorbent body.

6. A cryogenic refrigerator according to claim 2, wherein each of said heating means comprises a pair of electrodes provided on the associated body of adsorbent, and a power circuit connected to said electrodes for supplying electric current to said adsorbent bodies through said electrodes.

7. A cryogenic refrigerator in accordance with claim 1, wherein said means for continuously circulating a second coolant comprises:
   inlet conduit means for providing fluid communication between said second coolant chamber and a point exterior to said outer vessel;
   outlet conduit means for providing fluid communication between said second coolant chamber and a point exterior to said outer vessel; and
   a first conduit loop connecting said inlet conduit means with said outlet conduit means.

8. A cryogenic refrigerator in accordance with claim 7 wherein said first conduit loop includes a Joule-Thomson expansion valve.

9. A cryogenic refrigerator in accordance with claim 7 further comprising means for circulating the first coolant through said first coolant chamber, said means for circulating said first coolant comprising:
   an inlet conduit providing fluid communication between said first coolant chamber and a point exterior to said outer vessel;
   an outlet conduit providing fluid communication between said first coolant chamber and a point exterior to said outer vessel; and
   a second conduit loop connecting said inlet conduit with said outlet conduit.

10. A cryogenic refrigerator in accordance with claim 9 wherein each of said first and second conduit loops contains a Joule-Thomson expansion valve and wherein said first conduit loop passes through a cooling chamber adapted to receive a substance to be cooled.

11. A cryogenic refrigerator in accordance with claim 9 wherein said adsorbent body is a hollow cylinder and wherein said inlet conduit extends into the hollow of said hollow cylinder.

12. A cryogenic refrigerator in accordance with claim 7 wherein said first conduit loop contains an adsorbent body and heating means for intermittently heating said adsorbent body to alternately adsorb and release the second coolant.

13. A cryogenic refrigerator in accordance with claim 1 further comprising hydrogen, as the second coolant, contained within said second coolant chamber and helium, as the first coolant, contained within said first coolant chamber.

14. A cryogenic refrigerator in accordance with claim 2, wherein said means for continuously circulating a second coolant comprises:
   inlet conduit means for providing fluid communication between said second coolant chamber and a point exterior to said outer vessel;
   outlet conduit means for providing fluid communication between said second coolant chamber and a point exterior to said outer vessel; and a first conduit loop connecting said inlet conduit means with said outlet conduit means.

15. A cryogenic refrigerator in accordance with claim 14 wherein said first conduit loop includes a Joule-Thomson expansion valve.

16. A cryogenic refrigerator in accordance with claim 14 further comprising means for circulating the first coolant through said first coolant chambers, said means for circulating said first coolant comprising:
- inlet conduits providing fluid communication between said first coolant chambers and a point exterior to said second coolant chamber;
- outlet conduits providing fluid communication between said first coolant chambers and a point exterior to said outer vessel; and
- a second conduit loop connecting said inlet conduits with said outlet conduits.

17. A cryogenic refrigerator in accordance with claim 16 wherein each of said first and second conduit loops contains a Joule-Thomson expansion valve and wherein said first conduit loop passes through a cooling chamber adapted to receive a substance to be cooled.

18. A cryogenic refrigerator in accordance with claim 16 wherein said adsorbent bodies are each a hollow cylinder and wherein an inlet conduit extends into the hollow of said hollow cylinder.

19. A cryogenic refrigerator in accordance with claim 14 wherein said first conduit loop contains an adsorbent body and heating means for intermittently heating said adsorbent body to alternately adsorb and release the second coolant.

20. A cryogenic refrigerator in accordance with claim 2 further comprising hydrogen, as the second coolant, contained within said second coolant chamber and helium, as the first coolant, contained within said first coolant chamber.

* * * * *

UNITED STATES PATENT AND TRADEMARK OFFICE
CERTIFICATE OF CORRECTION

PATENT NO. : 5,339,649
DATED : August 23, 1994
INVENTOR(S) : KAWAI et al

It is certified that error appears in the above-indentified patent and that said Letters Patent is hereby corrected as shown below:

Col. 7, line 37, "Peltlet" should read --Peltier--; and line 55, "Peltlet" should read --Peltier--.

Col. 11, line 43, "Peltlet" should read --Peltier--.

Signed and Sealed this

Thirtieth Day of May, 1995

Attest:

BRUCE LEHMAN

Attesting Officer     Commissioner of Patents and Trademarks